United States Patent
Clawson

(10) Patent No.: US 7,428,301 B1
(45) Date of Patent: Sep. 23, 2008

(54) METHOD AND SYSTEM FOR THE EXIT PROTOCOL OF AN EMERGENCY MEDICAL DISPATCH SYSTEM

(76) Inventor: Jeffrey J. Clawson, 4649 Farm Meadow La., Salt Lake City, UT (US) 84111

( * ) Notice: Subject to any disclaimer, the term of this patent is extended or adjusted under 35 U.S.C. 154(b) by 75 days.

(21) Appl. No.: 09/685,697

(22) Filed: Oct. 9, 2000

(51) Int. Cl.
- H04M 11/04 (2006.01)
- H04M 3/00 (2006.01)
- H04M 5/00 (2006.01)
- A61B 5/00 (2006.01)

(52) U.S. Cl. .............................. 379/45; 379/41; 379/42; 379/265.01; 600/300; 600/301

(58) Field of Classification Search ............ 379/106.02, 379/38, 45, 37, 265.01, 202.01, 41; 705/3; 707/3; 709/224; 340/573.1; 700/90; 600/301, 600/300
See application file for complete search history.

(56) References Cited

U.S. PATENT DOCUMENTS

| | | | |
|---|---|---|---|
| 3,799,147 A | 3/1974 | Adolph et al. | 128/2.05 S |
| 4,130,881 A | 12/1978 | Haessler et al. | |
| 4,164,320 A | 8/1979 | Irazoqui et al. | |
| 4,237,344 A * | 12/1980 | Moore | 379/38 |
| 4,290,114 A | 9/1981 | Sinay | 364/900 |
| 4,338,493 A * | 7/1982 | Stenhuis et al. | 379/38 |
| 4,360,345 A | 11/1982 | Hon | 434/262 |
| 4,455,548 A | 6/1984 | Burnett | |
| 4,489,387 A | 12/1984 | Lamb et al. | |
| 4,731,725 A | 3/1988 | Suto et al. | 364/415 |
| 4,839,822 A | 6/1989 | Dormond et al. | |
| 4,858,121 A | 8/1989 | Barber et al. | |
| 4,865,549 A | 9/1989 | Sonsteby | |
| 4,922,514 A | 5/1990 | Bergeron et al. | 379/6 |
| 4,926,495 A | 5/1990 | Comroe et al. | |
| 4,945,476 A | 7/1990 | Bodick et al. | |
| 4,967,754 A | 11/1990 | Rossi | |
| 5,063,522 A | 11/1991 | Winters | |
| 5,065,315 A | 11/1991 | Garcia | |
| 5,072,383 A | 12/1991 | Brimm et al. | |

(Continued)

OTHER PUBLICATIONS

Radosevich, Lynda, "Network holds sway on life, death," Computerworld, v27 n21, May 24, 1993, 2 pgs.

(Continued)

Primary Examiner—Thjuan K Addy
(74) Attorney, Agent, or Firm—John R. Thompson; Stoel Rives LLP

(57) ABSTRACT

A method and system for receiving, processing and responding to emergency medical calls by emergency dispatchers is described. A consistent, standard and systematic process is provided which in combination with adequate training, supervision and quality assurance serves to provide a method for gathering emergency medical information, categorizing such information into various determinant levels for appropriate response, and for giving qualified emergency medical information to callers thereby permitting "zero-time" response by those at the scene. By using this invention properly a dispatcher is guided through the interrogation of callers, gathering the critical information, dispatching the appropriate mobile care rapidly when needed and, especially in this embodiment, giving the appropriate guidance to the caller. This invention specifically guides the dispatcher through the universal exit protocol, thereby using determinate criticality values to identifying the most urgent emergencies and give consistent reliable post-dispatch instructions.

12 Claims, 7 Drawing Sheets

U.S. PATENT DOCUMENTS

| | | | |
|---|---|---|---|
| 5,077,666 A | | 12/1991 | Brimm et al. |
| 5,086,391 A | * | 2/1992 | Chambers ................. 340/573.1 |
| 5,109,399 A | | 4/1992 | Thompson |
| 5,122,959 A | | 6/1992 | Nathanson et al. |
| 5,193,855 A | | 3/1993 | Shamos |
| 5,228,449 A | | 7/1993 | Christ et al. ................. 128/691 |
| 5,253,164 A | | 10/1993 | Holloway et al. |
| 5,255,187 A | | 10/1993 | Sorensen |
| 5,291,399 A | | 3/1994 | Chaco |
| 5,323,444 A | | 6/1994 | Ertz et al. |
| 5,339,351 A | | 8/1994 | Hoskinson et al. ............ 379/45 |
| 5,348,008 A | | 9/1994 | Bornn et al. ................. 128/642 |
| 5,379,337 A | | 1/1995 | Castillo et al. |
| 5,404,292 A | | 4/1995 | Hendrickson .......... 364/413.02 |
| 5,410,471 A | | 4/1995 | Alyfuku et al. |
| 5,423,061 A | | 6/1995 | Fumarolo et al. |
| 5,438,996 A | | 8/1995 | Kemper et al. ......... 128/661.02 |
| 5,441,047 A | | 8/1995 | David et al. |
| 5,462,051 A | | 10/1995 | Oka et al. .................... 128/630 |
| 5,471,382 A | | 11/1995 | Tallman et al. .............. 364/406 |
| 5,502,726 A | | 3/1996 | Fischer ....................... 370/94.1 |
| 5,513,993 A | | 5/1996 | Lindley et al. ............... 434/319 |
| 5,516,702 A | | 5/1996 | Senyei et al. ................. 436/510 |
| 5,521,812 A | * | 5/1996 | Feder et al. .................... 700/90 |
| 5,536,084 A | | 7/1996 | Curtis et al. |
| 5,544,649 A | * | 8/1996 | David et al. ................. 600/301 |
| 5,554,031 A | | 9/1996 | Moir et al. ................... 434/111 |
| 5,590,269 A | | 12/1996 | Kruse et al. ................. 395/209 |
| 5,594,638 A | * | 1/1997 | Iliff ................................. 705/3 |
| 5,594,786 A | | 1/1997 | Chaco et al. |
| 5,596,994 A | | 1/1997 | Bro |
| 5,630,125 A | | 5/1997 | Zellweger |
| 5,636,873 A | | 6/1997 | Sonsteby |
| 5,650,995 A | | 7/1997 | Kent |
| 5,660,176 A | | 8/1997 | Iliff ........................... 128/630 |
| 5,675,372 A | | 10/1997 | Aguayo, Jr. et al. |
| 5,682,419 A | | 10/1997 | Grube et al. |
| 5,684,860 A | | 11/1997 | Milani et al. |
| 5,689,229 A | | 11/1997 | Chaco et al. |
| 5,719,918 A | | 2/1998 | Serbetciouglu et al. |
| 5,722,418 A | | 3/1998 | Bro ............................. 128/732 |
| 5,724,983 A | | 3/1998 | Selker et al. ................. 128/696 |
| 5,734,706 A | | 3/1998 | Windsor et al. |
| 5,745,532 A | | 4/1998 | Campana, Jr. |
| 5,748,907 A | | 5/1998 | Crane |
| 5,754,960 A | | 5/1998 | Downs et al. |
| 5,759,044 A | | 6/1998 | Redmond ............... 434/307 R |
| 5,761,278 A | | 6/1998 | Pickett et al. |
| 5,761,493 A | | 6/1998 | Blakeley et al. ............. 395/604 |
| 5,787,429 A | * | 7/1998 | Nikolin, Jr. .................... 707/10 |
| 5,805,670 A | | 9/1998 | Pons et al. ..................... 379/45 |
| 5,809,493 A | | 9/1998 | Ahamed et al. ............... 206/52 |
| 5,822,544 A | | 10/1998 | Chaco et al. |
| 5,823,948 A | | 10/1998 | Ross, Jr. et al. |
| 5,826,077 A | | 10/1998 | Blakeley et al. ............. 395/604 |
| 5,832,187 A | | 11/1998 | Pedersen et al. |
| 5,842,173 A | | 11/1998 | Strum et al. |
| 5,844,817 A | | 12/1998 | Lobley et al. ................ 364/578 |
| 5,857,966 A | | 1/1999 | Clawson ..................... 600/300 |
| 5,901,214 A | | 5/1999 | Shaffer et al. |
| 5,902,234 A | * | 5/1999 | Webb ......................... 600/300 |
| 5,910,987 A | | 6/1999 | Ginter et al. ................. 380/24 |
| 5,912,818 A | | 6/1999 | McGrady et al. |
| 5,915,019 A | | 6/1999 | Ginter et al. ................... 380/4 |
| 5,926,526 A | | 7/1999 | Rapaport et al. ......... 379/88.25 |
| 5,933,780 A | | 8/1999 | Connor et al. |
| 5,961,446 A | | 10/1999 | Beller et al. |
| 5,962,891 A | | 10/1999 | Arai ............................ 257/324 |
| 5,964,700 A | | 10/1999 | Tallman et al. .............. 600/300 |
| 5,986,543 A | | 11/1999 | Johnson |
| 5,989,187 A | | 11/1999 | Clawson ..................... 600/300 |
| 5,991,730 A | | 11/1999 | Lubin et al. |
| 5,991,751 A | | 11/1999 | Rivette et al. ................... 707/1 |
| 6,004,266 A | | 12/1999 | Clawson ..................... 600/300 |
| 6,010,451 A | | 1/2000 | Clawson ..................... 600/300 |
| 6,022,315 A | | 2/2000 | Iliff |
| 6,035,187 A | | 3/2000 | Franza ........................ 455/404 |
| 6,040,770 A | | 3/2000 | Britton |
| 6,052,574 A | | 4/2000 | Smith, Jr. |
| 6,053,864 A | | 4/2000 | Clawson ..................... 600/300 |
| 6,058,179 A | | 5/2000 | Shaffer et al. |
| 6,074,345 A | | 6/2000 | van Oostrom et al. ....... 600/300 |
| 6,076,065 A | | 6/2000 | Clawson ......................... 705/2 |
| 6,078,894 A | | 6/2000 | Clawson et al. .............. 705/11 |
| 6,106,459 A | | 8/2000 | Clawson ..................... 600/300 |
| 6,112,083 A | | 8/2000 | Sweet et al. |
| 6,115,646 A | | 9/2000 | Fiszman et al. ............. 700/181 |
| 6,117,073 A | | 9/2000 | Jones et al. .................. 600/300 |
| 6,118,866 A | | 9/2000 | Shtivelman |
| 6,127,975 A | | 10/2000 | Maloney |
| 6,134,105 A | | 10/2000 | Lueker |
| 6,292,542 B1 | | 9/2001 | Bilder |
| 6,370,234 B1 | | 4/2002 | Kroll |
| 6,535,121 B2 | | 3/2003 | Matheny |
| 6,607,481 B1 | | 8/2003 | Clawson |
| 6,879,819 B2 | | 4/2005 | Brooks |
| 6,901,397 B1 | * | 5/2005 | Moldenhauer et al. ......... 707/3 |
| 6,931,112 B1 | * | 8/2005 | McFarland et al. ..... 379/202.01 |
| 6,968,375 B1 | * | 11/2005 | Brown ........................ 709/224 |
| 7,106,835 B2 | | 9/2006 | Saalsaa |
| 2002/0004729 A1 | | 1/2002 | Zak et al. |
| 2002/0106059 A1 | | 8/2002 | Kroll et al. |
| 2003/0028536 A1 | | 2/2003 | Singh et al. |
| 2003/0212575 A1 | | 11/2003 | Saalsaa et al. |
| 2006/0178908 A1 | | 8/2006 | Rappaport |
| 2007/0055559 A1 | | 3/2007 | Clawson |
| 2007/0116189 A1 | | 5/2007 | Clawson |

OTHER PUBLICATIONS

Harris, Roger, "Updated 911 Phone System Top Concern of Residents," Business First-Louisville, v9 n19 s1, Dec. 1992, 3 pgs.

"Geac Completes Software Install," Wireless Week, Nov. 18, 1996, 3 pgs.

"Dictaphone introduces Windows-based Computer-Aided Dispatch (CAD) system," Business Wire, Apr. 23, 1996, 2 pgs. (in commercial use in 1995).

Holroyd, Brian, et al., "Medical Control; Quality Assurance in Prehospital Care," JAMA, the Journal of American Medical Association, v256, n8, Aug. 1986, p. 1027-1031.

CBS web page News Story entitled "911 Operator: 'It's got to be Hell'", Mar. 31, 2006 (excerpts from 911 operators' actions during the attacks on Sep. 11 2001), 3 pgs.

Best, Wendy, "999 United Emergency services share life-saving Role to boost response," Western Daily Press, WDP Severnside ed., May 27, 1999, 2 pgs.

Poellmitz, William C., "Wireless technology keeps public safety a step ahead," Nation's Cities Weekly, v21 n17, Apr. 27, 1998, 3 pgs.

Crowley, Mark, "Learning from CAD System Implementation," Communications, v29 n8, Aug. 1992, 5 pgs.

Anonymous, "Suburban Chicago towns centralize 911 services," Communications News, v31 n10, Oct. 1994, 2 pgs.

Office Action Summary from USPTO for U.S. Appl. No. 10/255,901 mailed Dec. 31, 2003, 8 pgs.

Office Action Summary from USPTO for U.S. Appl. No. 10/255,901 mailed Oct. 13, 2004, 8 pgs.

Office Action Summary from USPTO for U.S. Appl. No. 10/255,901 mailed Jun. 29, 2005, 7 pgs.

Advisory Action Before the Filing of an Appeal Brief from USPTO for U.S. Appl. No. 10/255,901 mailed Feb. 14, 2006, 3 pgs.

Office Action Summary from USPTO for U.S. Appl. No. 10/255,901 mailed Jun. 7, 2006, 8 pgs.

Office Action Summary from USPTO for U.S. Appl. No. 10/255,901 mailed Feb. 27, 2007, 8 pgs.

Office Action Summary from USPTO for U.S. Appl. No. 10/255,901 mailed Sep. 6, 2007, 9 pgs.
Office Action Summary from USPTO for U.S. Appl. No. 10/255,905 mailed May 19, 2004, 7 pgs.
Office Action Summary from USPTO for U.S. Appl. No. 10/255,905 mailed May 26, 2005, 5 pgs.
Office Action Summary from USPTO for U.S. Appl. No. 10/255,905 mailed Feb. 9, 2006, 8 pgs.
Advisory Action Before the Filing of an Appeal Brief from USPTO for U.S. Appl. No. 10/255,905 mailed Aug. 11, 2006, 3 pgs.
Office Action Summary from USPTO for U.S. Appl. No. 10/255,905 mailed Jan. 30, 2007, 7 pgs.
Office Action Summary from USPTO for U.S. Appl. No. 10/255,905 mailed Oct. 5, 2007, 7 pgs.
Office Action Summary from USPTO for U.S. Appl. No. 10/140,635 mailed Oct. 3, 2003, 9 pgs.
Office Action Summary from USPTO for U.S. Appl. No. 10/140,635 mailed Jul. 16, 2004, 11 pgs.
Office Action Summary from USPTO for U.S. Appl. No. 10/140,635 mailed Apr. 19, 2005, 11 pgs.
Office Action Summary from USPTO for U.S. Appl. No. 10/140,635 mailed Jan. 17, 2006, 13 pgs.
Office Action Summary from USPTO for U.S. Appl. No. 10/140,635 mailed Sep. 20, 2006, 15 pgs.
Office Action Summary from USPTO for U.S. Appl. No. 10/140,635 mailed Jun. 21, 2007, 15 pgs.

\* cited by examiner

✗ CASE EXIT

| 1 ☎ 1st Party Caller | Universal Instructions | 1 ☎ 2nd Party Caller |
|---|---|---|
| Help is on the way.<br><br>Don't have anything to eat or drink.<br>It might make you sick or cause problems for the doctor.<br><br>(MEDICAL)<br>Just rest in the most comfortable position for you.<br><br>(TRAUMA)<br>Don't move around, unless it's absolutely necessary.<br>Just be still and wait for help to arrive.<br><br>Stable – 2<br>Unstable or Not alert – 3 | ✱ When the caller is not with the patient, begin instructions with:<br><br>Go back to her/him now and...<br><br>then follow the instructions with:<br><br>Don't hang up. Go do it now and tell me when it's done.<br><br>Repeat this phrase as appropriate whenever you send the caller away from the phone to do something. | (Reassure her/him that) Help is on the way.<br><br>Don't let her/him have anything to eat or drink.<br>It might make her/him sick or cause problems for the doctor.<br><br>(MEDICAL)<br>Just let her/him rest in the most comfortable position and wait for help to arrive.<br><br>(TRAUMA)<br>Don't move her/him, unless it's absolutely necessary.<br>Just tell her/him to be still and wait for help to arrive.<br><br>Stable – 2<br>Unstable or Not alert – 3 |
| 2 Routine Disconnect (= stable) – 1st Party | Airway | 2 Routine Disconnect — 2nd Party |
| I'm going to let you go now.<br><br>(Appropriate)<br>If you can, please:<br>• Put away any family pets.<br>• Gather your medications and write down the name of your doctor.<br>• Unlock the door.<br>• Turn on the outside lights.<br><br>(Always) If anything changes, call me back immediately for further instructions.<br><br>End<br><br>✱ Use caution when advising 1st party callers to do anything that would unduly exert themselves if their condition is traumatic, unstable, or worsening. | ✱ The airway of an unconscious patient must be constantly maintained.<br><br>✱ If the patient is outside:<br>Protect her/him from the elements.<br><br>then if necessary:<br>If s/he is cold, keep her/him warm.<br><br>✱ The sitting up position is usually best for alert patients with any breathing difficulty. | I want you to watch him/her very closely.<br><br>(Appropriate) If s/he becomes less awake and vomits, quickly turn her/him on her/his side.<br><br>(Appropriate)<br>Please:<br>• Put away any family pets.<br>• Gather the patient's medications and write the name of the patient's doctor.<br>• Unlock the door.<br>• Turn on the outside lights.<br>• Have someone meet the paramedics.<br><br>(Always) If s/he gets worse in any way, call me back immediately for further instructions.<br><br>End |

This protocol system for use under MPDS™ license agreement only. U.S. Patent 5,857,966. ©2000 Medical Priority Consultants, Inc. All rights reserved.  AMPDS™ v11.0 B-9s, NAE-std, 000814

CASE EXIT

7 — Danger Present – Scene/HAZMAT (714)

Listen carefully. This could be a very dangerous situation.
Do not approach (or touch) the patient at all.
Let the paramedics (EMTs) handle it.
(If anything changes, call me back from a safe place, if possible, for further instructions.)

Danger–Leave now – 12
End

8 — Danger Present – Violent Patient (715)

Try to avoid any contact with her/him.
Tell me immediately if s/he leaves the scene or passes out.
(Do not disturb the scene or move anything.)

Left scene – 11
Danger–Leave now – 12

• (Unconscious) Do you think it is safe to approach the patient now?

Yes – ABC-1
No – 12

9 — Danger Present – Assailant/Animal nearby (716)

Keep very quiet and stay out of sight.
Tell me immediately if the assailant/animal leaves the scene.
(Do not disturb the scene or move anything.)

• (Left scene) Are you sure the assailant/animal has left?

Yes – 10
No – 12
Danger–Leave now – 12

Danger Awareness (721)

* Scenes involving dangerous physical conditions, assailants, and violent patients can change rapidly for the worse. EMDs should reassess often, and not hesitate to advise the caller to get away (or attain a safer location) whenever their safety is in reasonable doubt then call back from somewhere safe.

* Keeping a caller on the line in some dangerous incidents could create more danger by making them visible or more accessible to a violent patient or intruder.

* If the caller is in danger from another person and is advised to leave now, tell them not to hang up, and leave the phone off the hook, allowing the EMD to monitor sounds and activity at the initial scene.

10 — Danger Gone – Verification (717)

Listen carefully. This could still be a very dangerous situation, but if you are sure the danger has gone, you could help the patient.
(Do not disturb the scene or move anything.)

• Do you think it is safe to approach the patient now?

Yes – 1
Yes (airway) – ABC-1
No/Uncertain – 11

11 — Danger Uncertain – Monitor Safety on Line (718)

I'm going to stay on the line to be sure you're still safe.
If the assailant/animal comes back, tell me right away.
Let me know when the paramedics (EMTs) arrive.

Danger back–Leave now – 12
End on Arrival

12 — Danger Present – Leave Now (719)

(If it's too dangerous to stay where you are, and you think you can leave safely,) get away and call me from somewhere safe.

End

13 — Cooling and Flushing (720)

(Heat or Fire)
Cool the burn for up to 10 minutes with water.
(Chemical)
Flush the area with a lot of water until help arrives.

Airway – ABC-1
–1

FIGURE 7c

METHOD AND SYSTEM FOR THE EXIT
PROTOCOL OF AN EMERGENCY MEDICAL
DISPATCH SYSTEM

BACKGROUND OF THE INVENTION

1. Field of the Invention

This invention relates to methods and systems for processing and responding to emergency medical inquiries. Specifically, this invention relates to the process or method for receiving and processing critical information regarding emergency medical calls. Also, this invention specifically relates to such a system and apparatus for performing the steps of a process for receiving and processing critical emergency medical information as well as providing programmed consistent instructions for the care of patient.

Providing adequate emergency medical care presents several critical challenges to medical care providers. These challenges include: the proximity to the care provider, the time required for help to arrive, the identification of the criticality of the emergency, the appropriate level of care provided, the variances in training of emergency medical dispatcher personnel, and limited nature of emergency care resources. This invention addresses these challenges by providing a consistent and proven system for: First, gathering necessary medical complaint information from emergency medical inquiry callers. Second, prioritizing the complaint to determine the criticality of the emergency. Third, providing emergency verbal instructions to individuals at the scene. Fourth, assisting dispatched responders to be prepared for each emergency situation. And, fifth, advising those on the way to provide care at the scene of specific problems or potential hazards. When used correctly this invention decreases the effective response time, while increasing the professionalism and control of emergency medical dispatchers; increases the accuracy and appropriateness of patient interrogation and well as the quality of gathered information; reduces the number of multiple unit and light-and-siren responses thereby reducing the risk of emergency medical vehicular collisions; improves patient care; reduces burn-out and stress of dispatchers by improving their quality of training and performance; decreases the risk of responder injury or mistake by providing responders with improved knowledge of the situation; and provides a means for continuously improving the quality of emergency medical dispatching and, as a result, emergency patient care.

2. Description of Related Art

It is desirable to provide a systematic and standardized method for responding to emergency medical requests and for providing consistent medically qualified instructions for the care of the patient. Although in the related art some attempt has been made to address the problem of medical care assessment, the related art does not address the specific problems of emergency dispatcher response that includes consistent medical guidance for the patient. Rather related art approaches known to the applicant describe the following. A process of helping patients assess their health, select appropriate health care, and guide such patients to an appropriate level and type of care. An automated medical history taking system and a technique wherein selected branch paths through a question repertory are provided. A method and apparatus for coordinating the actions of two or more medical teams, especially for instructional purposes. An expert system for providing suggested treatments for a patient with physical trauma. A medical payment system that incorporates computer technology in the storage, retrieval and processing of patient data and insurance claims. A knowledge base containing medical/pathological information on various diseases. A hospital computerized system for entering information pertinent to a patient's stay in the hospital. An expert computer system for processing medical claims. An interactive computerized apparatus and method for presenting medical information for diagnosis and study of disease. An automated and interactive positive motivation system to send a series of motivational messages and/or questions to a client to change or reinforce a specific behavioral problem. An artificial intelligent expert system. A rapid response health care communications system for providing rapid and reliable health services to patients located within or outside a health care facility. Several patents issued to the inventor of this application address some of the process of emergency medical dispatcher, but do not describe the specific improvements of this invention, in particular the exit protocol process.

For general background material, the reader is directed to U.S. Pat. Nos. 3,799,147, 4,130,881, 4,237,344, 4,290,114, 4,360,345, 4,489,387, 4,731,725, 4,839,822, 4,858,121, 4,922,514, 4,945,476, 5,063,522, 5,065,315, 5,072,383, 5,086,391, 5,228,449, 5,253,164, 5,255,187, 5,339,351, 5,348,008, 5,404,292, 5,438,996, 5,462,051, 5,471,382, 5,502,726, 5,513,993, 5,516,702, 5,521,812, 5,544,649, 5,554,031, 5,590,269, 5,594,638, 5,596,994, 5,660,176, 5,722,418, 5,724,983, 5,759,044, 5,761,493, 5,805,670, 5,809,493, 5,826,077, 5,844,817, 5,857,966, 5,910,987, 5,915,019, 5,926,526, 5,964,700, 5,962,891, 5,989,187, 5,991,751, 6,004,266, 6,010,451, 6,035,187, 6,053,864, 6,074,345, 6,076,065, 6,078,894, 6,106,459, 6,115,646, and 6,117,073. Each of the above references is hereby incorporated by reference in its entirety for the material disclosed therein.

SUMMARY OF THE INVENTION

It is desirable to provide a system for emergency medical dispatch of health care services that provides the dispatcher a systematic method of interrogation of callers, where inquiries and instructions are pre-scripted, thus eliminating the variability due to different skills of the individual dispatchers and the need for the dispatcher to attempt to recall the appropriate inquiries and instructions each time a call is received. Furthermore, it is desirable to provide a system for emergency medical care dispatch that improves the accuracy and appropriateness of patient interrogation and resulting response generation. Such a system can formalize the roll of the emergency medical dispatcher as part of the professional chain of patient care. It is also desirable to have a method for communicating with medical response teams such that multiple unit and light-and-siren responses are reduced, thereby reducing the collision risks to emergency vehicles and preserving the limited emergency response resources. It is desirable to provide a medical dispatch system that improves patient care by improving the accuracy and usefulness of gathered information, thereby reserving paramedic teams for the most critical emergencies. It is desirable to have a medical dispatch system that reduces dispatcher burn-out and stress by improving information relayed to field responders while simultaneously providing such responders with increased safety awareness and knowledge of the field situation. Moreover, it is desirable to have a medical dispatch system that provides programmed instructions for the care of the patient, wherein such programmed instructions are based on determinant data calculated from the responses to pre-programmed inquiries.

Accordingly, it is the primary object of this invention to provide a medical dispatch system that is designed to guide the medical dispatcher through the exit interrogation, obtaining essential patient information and providing predefined instructions.

Another object of this invention is to provide a cross-referenced scripted set of instructions to be given by the dispatcher to the caller in a medical emergency situation.

It is a further object of this invention to provide a method of determining the criticality of a medical emergency and communicating such level of criticality to the response personnel.

It is a still further object of this invention to provide a method for gathering and communicating information concerning the situation at the field location to the response personnel and the emergency medical callers.

A further object of this invention is to improve the quality, efficiency and usefulness of the information received to and communicated by emergency medical dispatchers thereby improving the quality of emergency medical services provided to patient before, during and after the arrival of emergency medical technicians.

A still further object of this invention is to provide a method, system and apparatus for an improved exit protocol for emergency medical dispatchers.

These and other objects of this invention, which will be clear to those of ordinary skill in the art upon review of this patent specification and claims, are achieved by an invention which permits a systematic gathering of patient information, with a set of scripted instructions and with guidance for relaying information to the field emergency personnel. The method and system of this invention is currently envisioned in two equally preferred embodiments. First, a set of cross-referenced cards with scripted questions, instructions and categorizations is provided. Second, a computerized process is provided with software controlling the access and reference points to a computerized database of emergency medical inquiries and instructions are provided. Each preferred embodiment incorporates the same essential method of this invention, though each has its own particular advantages.

BRIEF DESCRIPTION OF THE DRAWINGS

FIG. 7 depicts the preferred embodiment of the flip cards showing the steps of the exit protocol of the flip card deck embodiment of the invention.

Reference will now be made in detail to the present preferred embodiment of the invention, examples of which are illustrated in the accompanying drawings.

DETAILED DESCRIPTION OF THE INVENTION

This invention provides a method, system and an apparatus for receiving, processing and communicating emergency medical information, enabling an assessment of the critical or "key" information by trained emergency medical dispatch personnel. When the invention is properly employed the initial interrogation of the caller or patient will provide critical patient information, such as the patient's location, the caller's phone number, a description of what happened, the number of people hurt, injured or sick, the patient's age, and the patient's status as to consciousness and breathing. This information is then immediately put to use identifying the criticality of the emergency and the appropriate medical response, as well as leading to a series of established medical instructions for the dispatcher to give to the caller. This particular embodiment of the invention makes use of the criticality determinate of the emergency to provide the programmed exit protocol or standardized medical instructions to the caller.

Figure 1:
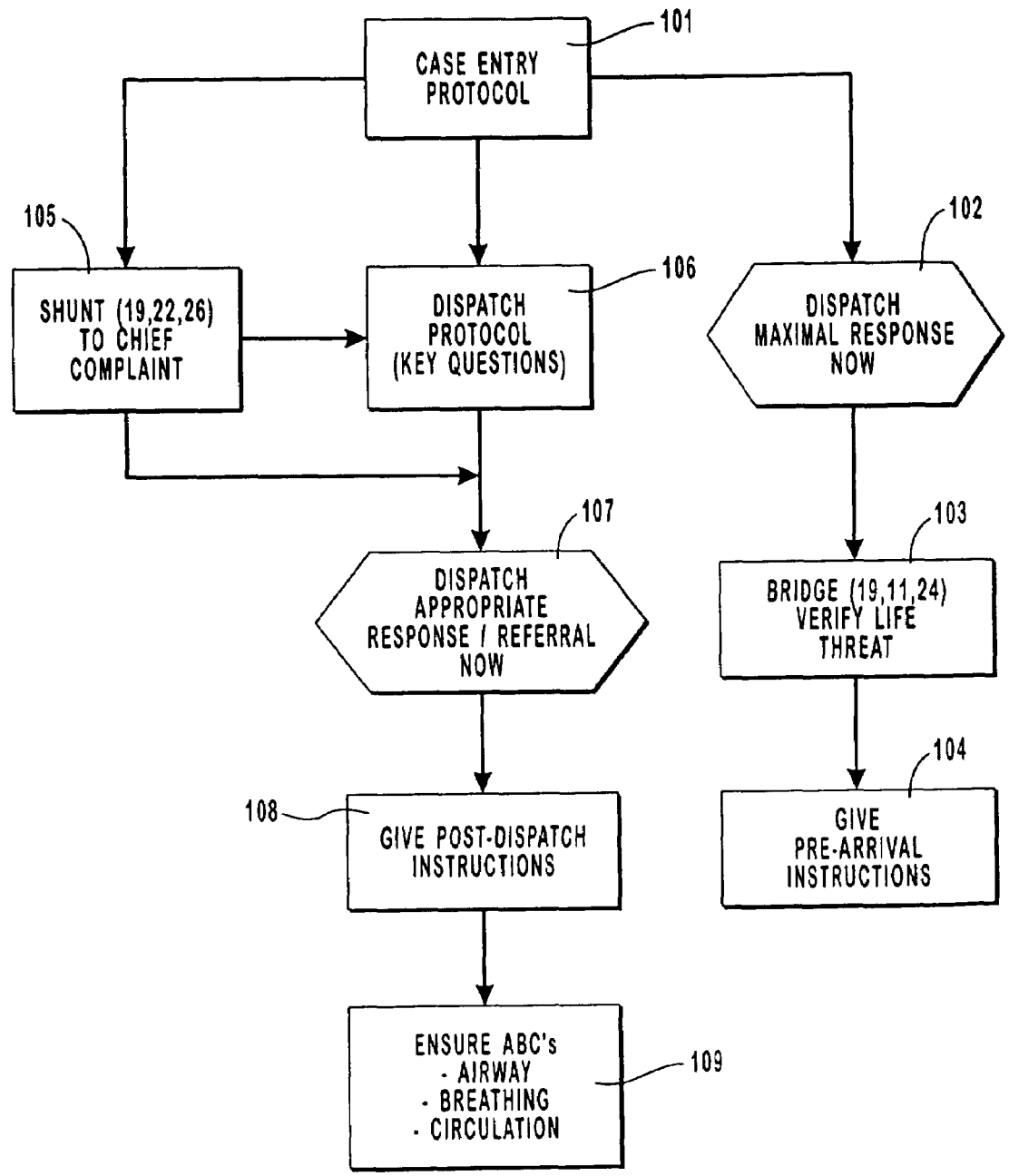
FIG. 1 depicts the principle elements of the complete system in which the preferred embodiment of the invention operates and the relationship of the elements of the system to each other and puts into the context of the complete system, the specific claimed invention.

FIG. 1 shows the complete system in which the invention operates in its best mode. The process of managing emergency medical dispatchers, the information they require and the information they give is detailed in FIG. 1. The case entry protocol 101, provides the initial steps through which the all emergency callers or patients are taken to provide symptom information and to access medical information. The purpose of the case entry protocol 101 is to receive sufficient information to permit the dispatcher to identify the caller's chief complaint. This critical information received during the primary interrogation 101 includes a description of the problem (or the patient's complaint), the patient's age and the status of consciousness and breathing. This information is also referred to as "the four commandments of emergency medical dispatching." If the dispatcher receives information that the patient is unconscious and not breathing (or unconscious and breathing is uncertain or conscious but not breathing where the failure to breath has been verified), for whatever reason, a maximal response 102 is sent immediately, before continuing with any further interrogation or instructions, and the caller is told to stay on the line for further instructions. The life threat is then verified 103 and pre-arrival instructions are given 104. These pre-arrival instructions 104 include six treatment sequence algorithmic scripts covering Arrest, Choking, and Childbirth. Instructions 104 are given to guide the caller through CPR, the Heimlich Maneuver, or emergency childbirth procedures. In many cases, the result of properly conveyed instructions is a more viable patient by the time field personnel arrive. Should the dispatcher learn that the patient is breathing, but the dispatcher lacks sufficient information to directly go to the Key Questions of the Dispatch Protocol 106, the dispatcher is shunted 105 to additional interrogations whose purpose is to give the dispatcher the necessary information to ascertain the caller's chief complaint while focusing on heart problems, industrial/machinery accidents and/or general sick person issues. Once the dispatcher has enough information to have identified the caller's chief complaint, the dispatcher is taken to the Dispatch Protocol 106 where additional interrogations are performed to complete "key questions." This secondary interrogation 106 typically takes approximately 30 seconds and tends to focus on the specific or chief complaint of the caller. This secondary interrogation, or Dispatch Protocol 106, provides a more orderly and closer view of the patient so that the pre-hospital care provided is appropriate and in keeping with the severity of the injury or illness. During this step 106 the dispatcher will match the symptoms, or combination of symptoms, discovered through interrogation and send the appropriate response 107. The appropriate response 107 is determined through a system of assigning determinant levels and numbers, from A2 generally less serious to D1 generally very serious. When the dispatcher identifies a determinant in one of the four levels (Alpha-A, Bravo-B, Charlie-C, and Delta-D) the response configuration (emergency vehicles and the mode of response) is dispatched as indicated by the response protocol. After the responders (field emergency medical care-givers) has been sent, the dispatcher remains on the telephone with the caller to give programmed instructions 108 regarding what to do, and what not to do, prior to the arrival of the responders. This part of the process is the heart of the invention of this application. This information is taken from the "Post-Dispatch Instructions" section of the protocols and provided whenever possible and appropriate. A main purpose of these "Post-Dispatch Instructions" 108 is to prepare the patient for and to expedite the field personnel's work at the scene. "Post-Dispatch Instructions" include such instructions as to collect the patient's medications, write down the name of the family doctor and put away pets. Each caller is also instructed to ensure 109 that the patient has an open airway, is breathing, is given nothing to eat or drink before responders arrive and, if necessary, how to treat for shock using the procedure given in the reference script for Airway, Breathing, and Circulation. Callers are routinely advised to "call back if the patient's condition worsens for further instructions."

Figure 2:
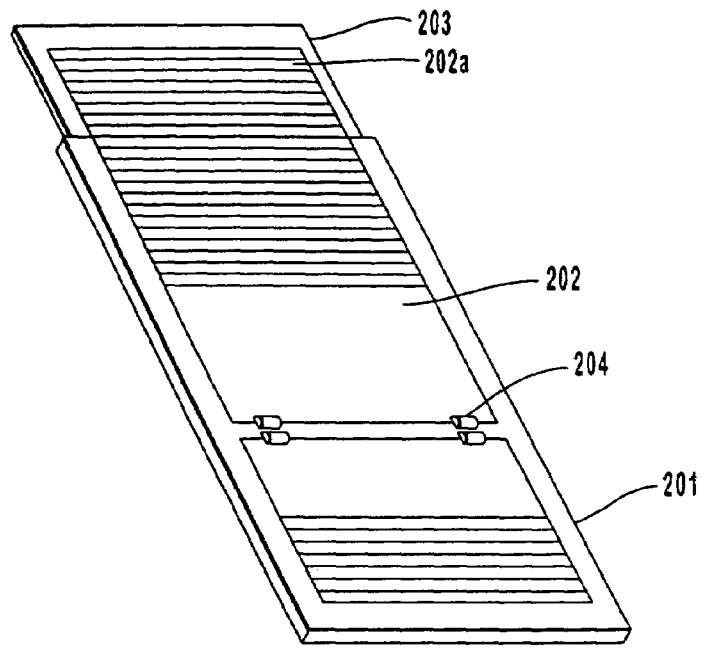
FIG. 2 depicts the flip card apparatus showing a preferred embodiment of the invention.

FIG. 2 depicts an embodiment of the flip card apparatus showing a preferred system for the use of the invention. One preferred embodiment of the invention involves the use of a flip card apparatus 201. The flip card apparatus 201 has the advantage of organizing the cards 202 so that the top or bottom, label edge of each card can be seen by the user. Each card 202 is separately fastened into the apparatus with one or more fasteners 204. The steps embodying the elements of this invention, the entry protocol, are displayed on a top flap 203 and the first card 202a. Alternative embodiments of the card apparatus can be a deck of cards bound in a manner well known to those skilled in the art. In the current embodiment of the flip card apparatus there are five different types of cards, including chief complaint cards, pre-arrival instruction cards, post-dispatch cards, determinant classification card and entry protocol cards. The cards are generally organized in pairs, with the top card providing the protocol questions, instructions, jump directions and determinant assignments. The bottom card provides information the dispatcher uses to improve the dispatcher's decision-making process.

Figure 3:
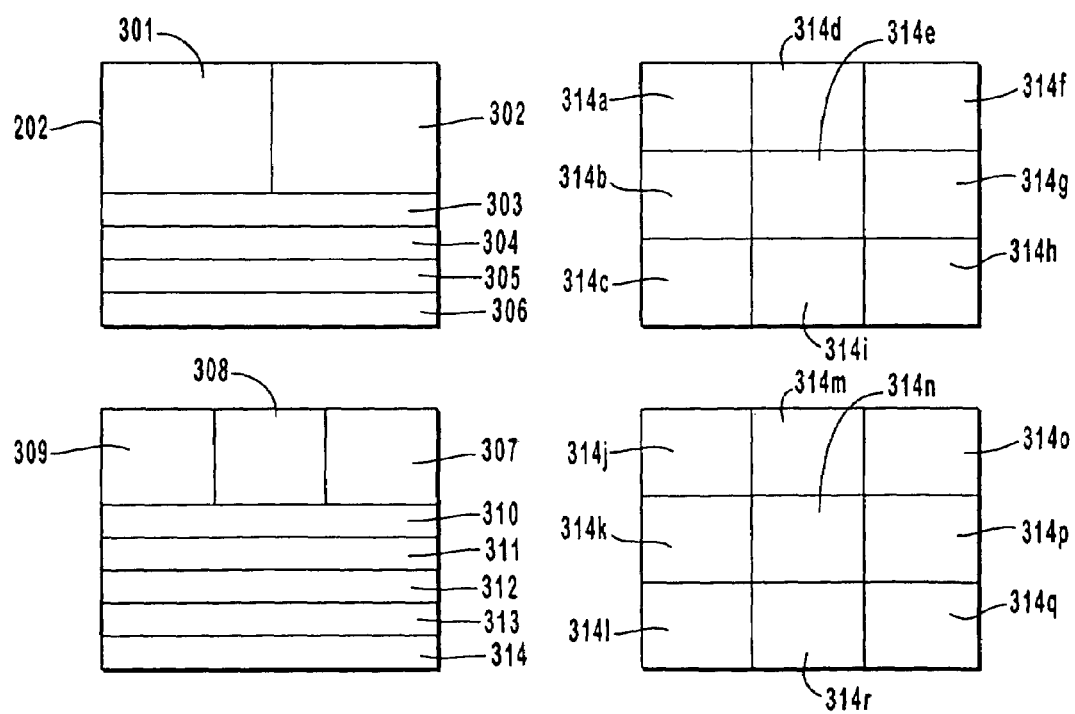
FIG. 3 shows a view of the sections of a typical flip card as used in the flip card apparatus embodiment of the invention.

FIG. 3 shows a view of the sections of a typical flip card, as used in the flip card apparatus embodiment of the invention. The typical flip card 202 is divided into logical sections for ease of use and consistency. A key question section 301 is provided as a script to the dispatchers to ensure that all key questions are asked in a calm, consistent, systematic manner. From the responses to the key questions from the key question section 301, typically the dispatcher determines the appropriate determinant level. Sections A-Alpha 303, B-Bravo 304, C-Charlie 305 and D-Delta 306 are provided to aid the dispatcher in making the determinant designation. Each determinant level may have one or more sublevels. Generally, the most critical call is given a determinant level of D-Delta and the least critical call is given a determinant level of A-Alpha. The more critical the determinant level assigned to a call, the more medical resources and urgency may be applied to provide help. For example, an A-Alpha call will typically be responded to by emergency medical technicians and an ambulance proceeding to the patient under the safest method reasonably possible, while a D-Delta call will typically be responded to by the closest emergency medical technicians, an ambulance, paramedics, all who will proceed under the most urgent method available. Sublevels may not indicate the criticality of the call; rather sublevel designations indicate the type of call, information often especially important to the dispatched medical team. After the determinant code is determined 303-306 the dispatcher is referred to the post-dispatch instructions section 302. The purpose of the post-dispatch instructions is to systematically prepare for and expedite the field personnel's job at the scene, and prevent further harm to the patient or others at the scene. The post-dispatch instruction section 302 includes such instructions as collecting the patient's medications, writing down the name of the family doctor and securing animals in the area. Each caller is also instructed, from the post-dispatch instruction section 302, to ensure that the patient has an open airway, is breathing, is given nothing to eat or drink before responders arrive, and, if needed, how to treat for shock using a reference script. Callers are also routinely advised to "call back if the patient's condition worsens for further instructions." Pre-arrival instructions 106 are provided on alternative cards 314, subsectioned as shown in FIG. 3 as 314a-r. These pre-arrival instruction sections 314 provide scripted treatment sequences for arrest, choking, and childbirth. These procedures, provided through sections 314, guide the caller through CPR, the Heimlich Maneuver or emergency childbirth procedures. Sections 307 to 314 provide important information to the dispatcher for the dispatcher's use in providing more educated responses. This information includes such information as categorizations of dangerous areas or injuries; types of injuries; symptoms; rules and axioms. Such information as is systematically provided to place the key questions of section 301, the determinant classifications of sections 303-306, and the post-dispatch instructions of section 302 into context for the dispatcher.

Figure 4A:
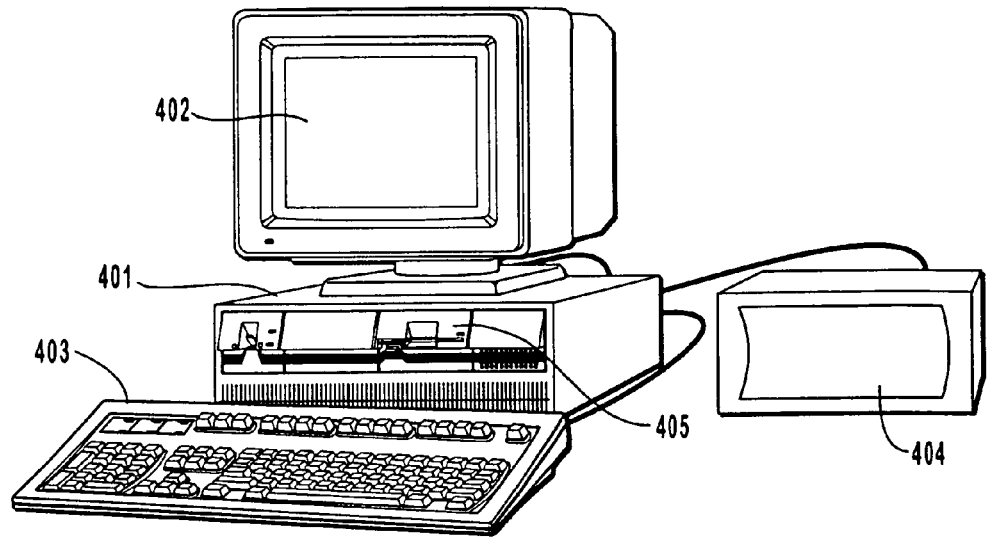
FIGS. 4a and 4b show a system diagram showing the components of a typical computer system and telephone device used in the computerized embodiment of the invention.
Figure 4B:
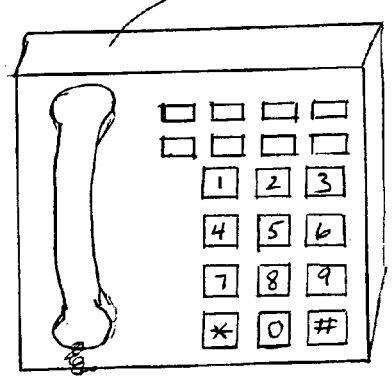

FIG. 4a shows a system diagram of the components of a typical computer system used in the computerized embodiment of the invention. A second preferred embodiment of the invention is designed to operate in combination with a computer system using specially designed computer software incorporating the procedure of the invention. A typical computer system used in combination with software incorporating the invention includes a processing unit 401 to execute the instructions of the software; a display unit 402 to provide the means for providing the dispatcher with the prompts and information necessary to practice the invention; an input device 403 to provide the means for the dispatcher to interact with the software version of the invention; a storage device 405 for storage of the software and the files associated with the invention; and an output device 404 for printing reports and other information. FIG. 4b shows the telephone 406 communication system preferably used with this invention.

Figure 5:
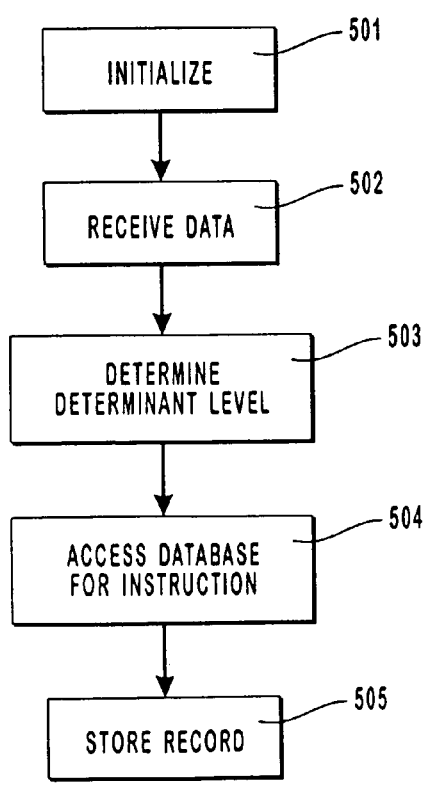
FIG. 5 shows a flow chart representation of the preferred top-level steps of the invention.

FIG. 5 shows a process flow chart representation of the preferred top-level steps of the invention. The software embodiment of the procedure of the invention is accomplished by performance of a number of procedural steps. First, the software is initialized 501. Data is received 502 following the request for information from the caller. As data is received 502, the determinant level is determined 503. Intermediate determinant levels are produced as information is received and processed, the final determinant level is only achieved after all necessary information is received and processed. A database is accessed 504 to produce the appropriate instructions for communication with the caller. Records of the calls and queries are stored 505, for historical reports, for review of the dispatchers and for continued quality assurance control.

Figure 6:
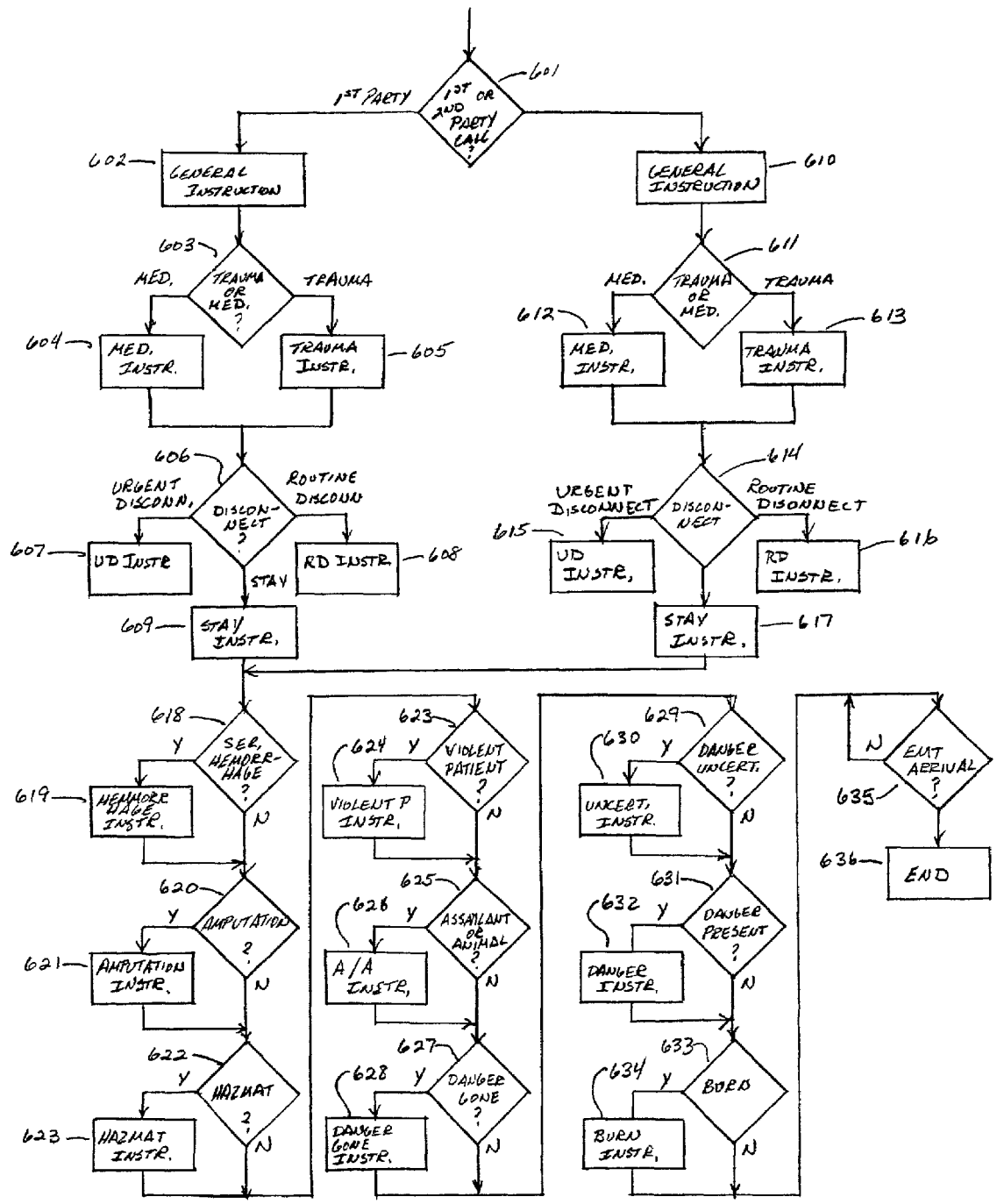
FIG. 6 depicts the detailed steps of the exit protocol steps of the process of the preferred embodiment of the invention.

FIG. 6 depicts the detailed steps of the exit protocol process of the preferred embodiment of the invention, which typically provides the post dispatch instructions. Although the following steps of the process of the invention are describe, the reader should note that each step need not be accomplished in this specific order, alternative ordering of the steps of the invention are possible, this order of the steps of the process has been determined by the inventor to be the best mode of the invention. First, it is determined 601 whether the caller is the injured person ($1^{st}$ party) or another ($2^{nd}$ party). If it is a $1^{st}$ party call, general instructions are given 602. These general instructions 602 include telling the caller that help is on the way and that the caller should not have anything to eat or drink since it might make the patient sick or cause problems for the doctor. An inquiry 603 is made to determine whether the call concerns a medical problem (illness) or a trauma. If it is a medial problem, then a medical instruction is given 604. The preferred medical instruction 604 is for the patient to rest in the most comfortable position possible. If it is a trauma call, a trauma instruction 605 is given. The preferred trauma instruction 605 is to not move around unless absolutely necessary—to just be still and wait for help to arrive. If 606 it is necessary to disconnect the caller, it is determined whether the disconnection is urgent (such as caused by another call or other emergency) or routine (as might be used when the medical call is not serious and/or help has arrived. If it is an urgent disconnect, then the urgent disconnect instruction 607 is given. The preferred urgent disconnect instruction is to tell the caller that the dispatcher needs to hang up now, that help is on the way and that if anything changes, to call the dispatcher back immediately for further instructions. If it is a routine disconnect, the routine disconnect instruction 608 is given. The preferred routine disconnect instruction 608 is to put away family pets, gather medications, write down the name of the patient's doctor, unlock the door, and turn on the outside lights. Always the instruction is given to call back immediately, if anything changes, for further instructions. If a call disconnect is not necessary, then a stay on the line instruction 609 is given. The preferred stay on the line instruction 609 is that the dispatcher will stay on the line as long as possible, to tell the dispatcher if anything changes, and to request that the caller tell the dispatcher when the paramedics (or EMTs) arrive. Following the stay on the line instruction 609, the dispatcher will give specific instructions depending on the previously identified chief complaint and determinant value.

If a 2nd party makes the call, then the $2^{nd}$ party general instructions 610 are given. The preferred $2^{nd}$ party general instructions include reassuring him/her that help is on the way, telling him/her not to give the patient anything to eat, as it may make him/her sick and/or cause problems for the doctor. An inquiry 611 is made to determine if it is a medial (illness) call or a trauma call. If it is a medical call, then the medical instruction 612 is given. The preferred $2^{nd}$ party medical instruction 612 is to just let the patient rest in the most comfortable position available and to wait for help to arrive. If it is a trauma call, then the trauma instruction 613 is given. The preferred trauma instruction 613 is to not move the patient unless it is absolutely necessary and to tell him/her to have the patient keep still and wait for help to arrive. If 614 it is necessary to disconnect the caller, it is determined whether the disconnection is urgent (such as caused by another call or other emergency) or routine (as might be used when the medical call is not serious and/or help has arrived. If it is an urgent disconnect, then the $2^{nd}$ party urgent disconnect instruction 615 is given. The preferred $2^{nd}$ party urgent disconnect instruction is to tell the caller that the dispatcher needs to hang up now, that help is on the way and that if the patient gets worse in any way to call back for further instructions. If appropriate, the instruction is given to quickly turn the patient on his/her side if he/she becomes less awake and vomits. If it is a routine disconnect, the $2^{nd}$ party routine disconnect instruction 616 is given. The preferred $2^{nd}$ party routine disconnect instruction 616 is to put away family pets, gather medications, write down the name of the patient's doctor, unlock the door, turn on the outside lights and have some meet the paramedics. Always the instruction is given to call back immediately, if patient gets worse in any way, for further instructions. If a call disconnect is not necessary, then a stay on the line instruction 617 is given. The preferred stay on the line instruction 617 is that the dispatcher will stay on the line as long as possible, that the caller should watch the patient very closely and look for any changes, to tell the dispatcher if the patient becomes less awake or starts getting worse, and to request that the caller tell the dispatcher when the paramedics (or EMTs) arrive. Following the stay on the line instruction 617, the dispatcher will give specific instructions depending on the previously identified chief complaint and determinant value.

The specific instructions depend on the previously identified chief complaint and determinant value assigned. If 618 the patient is hemorrhaging severely, the hemorrhage instruction is given 619. The preferred hemorrhage instruction 619 is: don't use a tourniquet, rather to listen carefully to the instructions for stopping the bleeding; to get a clean, dry cloth or towel and place it right on the wound; press down firmly and don't lift it up to look. If it keeps bleeding, the caller is told that he/she is probably not pressing hard enough. The caller is told to keep firm, steady pressure on the wound. If 620 the patient has suffered amputation, the amputation instruction is given 621. The preferred amputation instruction 621 is for the caller to locate all amputated parts or skin and place them in a clean plastic bag. The caller is instructed not to place any amputated parts on ice or in water as these may damage the part. If 622 the patient is in a hazardous material contaminated area, the hazardous material instruction is given 623. The preferred hazardous material instruction 623 is to inform the caller that this could be a very dangerous situation. The $2^{nd}$ party caller should not approach or touch the patient at all. They should let the paramedics handle the situation. The caller is instructed to call back from a safe place, f possible. Depending on the criticality, the caller may be told to leave immediately. If 623 the patient is violent, the violent patent instruction is given 624. The preferred violent patent instruction 624 is to avoid any contact with the patient, to tell the dispatcher if he/she leaves the scene or passes out and not to disturb the scene or move any thing. Depending on the criticality determinant the caller may be told that there is danger and to leave now. If 625 an assailant or dangerous animal is nearby, the assailant/animal instruction is given 626. The preferred assailant/animal instruction 626 is to keep very quiet and to stay out of sight, to tell the dispatcher if the assailant or animal leaves the scene and not to disturb the scene or move any thing. Depending on the criticality determinant the caller may be told that there is danger and to leave now. If 627 the caller is uncertain whether the danger is gone, then the danger-gone instruction is given 628. The preferred danger gone instruction 628 is to listen carefully, this could still be a very dangerous situation, but if the caller is sure the danger is gone they can help the patient. If 629 the caller is still uncertain whether the danger has passed, the uncertainty instruction is given 630. The preferred uncertainty instruction 630 is that the dispatcher will stay on the line to be sure the caller is safe. If the assailant/animal comes back, the caller is to tell the dispatcher right away. The caller is also instructed to let the dispatcher know when the paramedics (EMTs) arrive. If 631 danger remains present, the danger instruction is given 632. The preferred danger instruction 632 is "if it's too dangerous to stay where you are, and you think you can leave safely, get away and call" the dispatcher from somewhere safe. If 633 the patient is suffering from a burn, the burn instruction is given 634. The preferred burn instruction 634 is to cool the burn for up to 10 minutes with water, if it is a heat or fire burn, or flush area of the burn with water until help arrives if it is a chemical burn. The dispatcher, preferably stays on the line until the paramedics (EMTs) arrive 635, at which point the process ends 636.

Figure 7B:
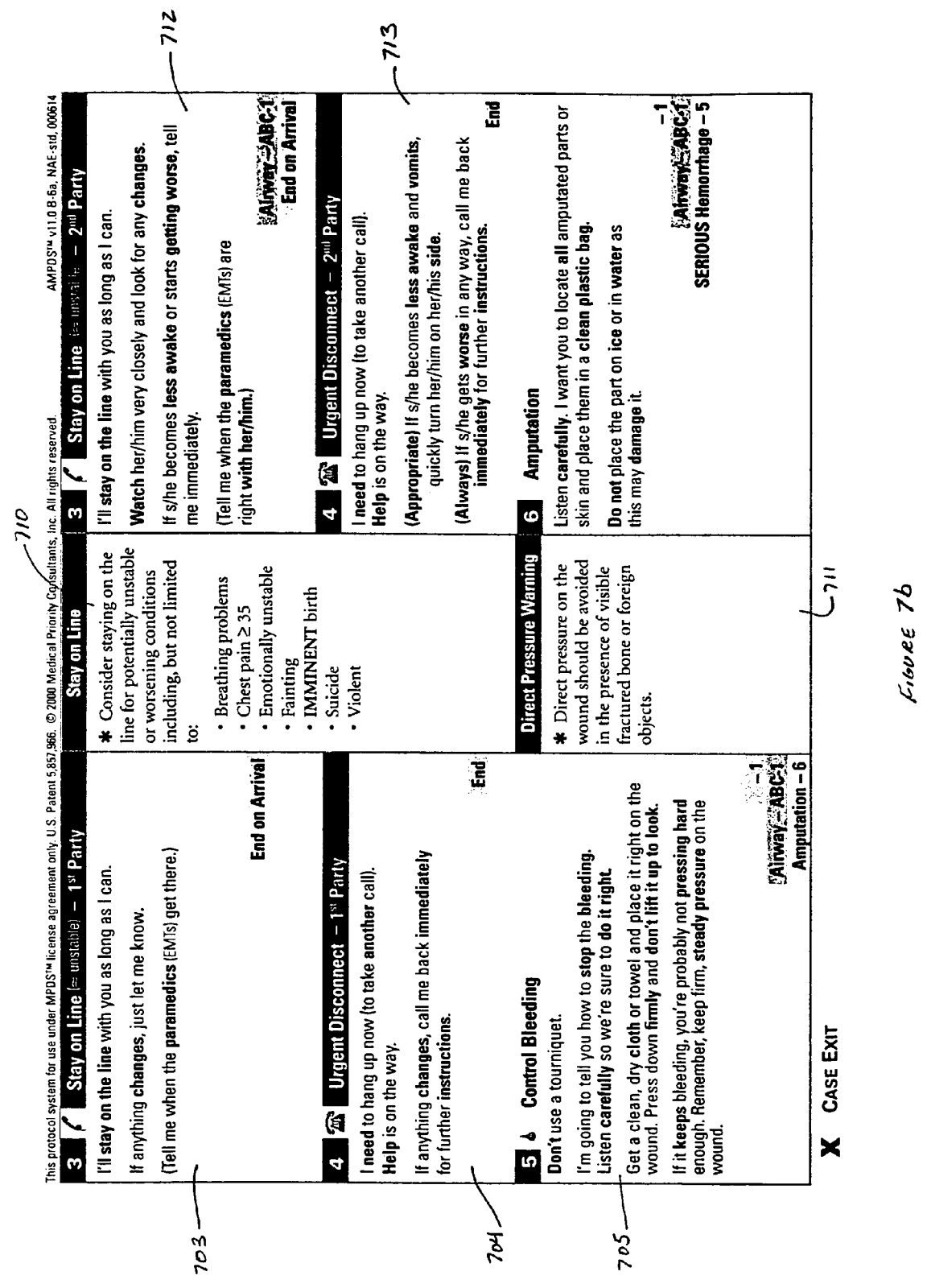

FIG. 7 depicts the preferred embodiment of the flip cards showing the steps of the exit protocol invention. The $1^{st}$ party caller section and the general instructions are shown 701. The $1^{st}$ party routine disconnect with instructions is shown in section 702. The $1^{st}$ party stays on line and instructions are shown in section 703. The $1^{st}$ party urgent disconnect and instruction is shown in section 704. The $2^{nd}$ party caller section and general instructions are shown in section 708. The $2^{nd}$ party routine disconnect and instruction are shown in section 709. The $2^{nd}$ party stay on the line and instructions are shown in section 712. The $2^{nd}$ party urgent disconnect and instruction is shown in section 713. Universal instructions 706, airway instructions 707, stay on the line 710 and direct pressure instructions 711 are also provided. The specific instruction sets control bleeding 705, hazardous material 714, violent patient 715, assailant/animal nearby 716, danger gone verification 717, danger uncertainty 718, danger present 719 and cooling and flushing 720 and associated instructions are provided. A danger awareness section 721 is also provided to give guidance to the dispatcher. It is to be understood that the above-described embodiments are merely illustrative of numerous and varied other embodiments which may constitute applications of the principles of the invention. Such other embodiments may be readily devised by those skilled in the art without departing from the spirit or scope of this invention and it is our intent that they be deemed within the scope of our invention.

I claim:

1. A method for managing the exit process of an emergency medical dispatch system, for dispatching medical assistance to persons needing such medical assistance, comprising the steps of:
   (a) receiving a medical call from a caller on a telephone communication device regarding a patient needing medical assistance, said patient having a chief complaint;
   (b) receiving from said caller a description of a problem giving rise to a call for medical assistance;
   (c) a pre-scripted interrogation automatically assigning one of a plurality of pre-established determinant levels based on the description of said problem, wherein said pre-scripted interrogation comprises determining if the caller is the patient, and wherein said pre-scripted interrogation automatically assigns said determinant level by providing a dispatcher with a plurality of preprogrammed inquiries ordered to guide said pre-scripted interrogation to systematically obtain said description of said problem and to traverse a path along a logical tree based on responses to said preprogrammed inquiries, wherein said path along said logical tree ends at an appropriate pre-established determinant level, wherein said preprogrammed inquiries are provided to said dispatcher on a medium readable by the dispatcher, and wherein,
   instructing said dispatcher to interrogate said caller using said plurality of preprogrammed inquiries,
   receiving from said dispatcher caller responses to said preprogrammed inquiries, and
   using said caller responses to traverse said logical tree and thereby assign said appropriate pre-established determinant level;
   (d) dispatching a medical response based on said determinant level; and
   (e) providing post dispatch instructions to a caller, prior to the arrival of the responders to prepare the patient for the responders and to expedite the field responders' work, based on said determinant level, thereby eliminating variability due to the different skills of the individual dispatchers.

2. A method for managing the exit process of an emergency medical dispatch system, as recited in claim 1, wherein said providing post dispatch instructions further comprises providing instructions based on a hemorrhaging patient.

3. A method for managing the exit process of an emergency medical dispatch system, as recited in claim 1, wherein said providing post dispatch instructions further comprises providing instructions based on a patient suffering amputation.

4. A method for managing the exit process of an emergency medical dispatch system, as recited in claim 1, wherein said providing post dispatch instructions further comprises providing instructions based on a hazardous material situation.

5. A method for managing the exit process of an emergency medical dispatch system, as recited in claim 1, wherein said providing post dispatch instructions further comprises providing instructions based on a violent patient situation.

6. A method for managing the exit process of an emergency medical dispatch system, as recited in claim 1, wherein said providing post dispatch instructions further comprises providing instructions based on the presence of an assailant or dangerous animal.

7. A method for managing the exit process of an emergency medical dispatch system, as recited in claim 1, wherein said providing post dispatch instructions further comprises providing instructions based on a patient suffering from burns.

8. A method for managing the exit process of an emergency medical dispatch system, as recited in claim 1, wherein said providing post dispatch instructions further comprises providing instructions based on a present danger situation.

9. A method for managing the exit process of an emergency medical dispatch system, as recited in claim 1, wherein said medium includes a flip card apparatus.

10. A method for managing the exit process of an emergency medical dispatch system, as recited in claim 1, wherein said medium includes software operated on a computer system to provide readable instructions on a display unit.

11. A method for managing the exit process of an emergency medical dispatch system, as recited in claim 1, wherein each of said determinant levels includes a plurality of sublevels.

12. A method for managing the exit process of an emergency medical dispatch system, as recited in claim 1, wherein the pre-scripted interrogation further comprises:
   (i) determining if said received call concerns trauma or an illness; and
   (ii) determining if said chief complaint concerns at least one of hemorrhaging, amputation, hazardous materials, a violent patient, an assailant, an animal, a present danger, and a burned patient.

* * * * *

UNITED STATES PATENT AND TRADEMARK OFFICE
CERTIFICATE OF CORRECTION

PATENT NO.       : 7,428,301 B1
APPLICATION NO.  : 09/685697
DATED            : September 23, 2008
INVENTOR(S)      : Jeffrey J. Clawson et al.

It is certified that error appears in the above-identified patent and that said Letters Patent is hereby corrected as shown below:

Column 2 on page 1, Line 17 of Abstract reads, "...values to identifying the most..." which should read, "...values to identify the most..."

Column 2 on page 2, Line 13 of Other Publications reads, "...attacks on Sep. 11 2001..." which should read, "attacks on Sep. 11, 2001..."

Column 2, Line 14 reads, "...process of emergency medical dispatcher..." which should read, "...process of emergency medical dispatch..."

Column 3, Line 37 reads, "...medical inquiries and instructions are provided." which should read, "...medical inquiries and instructions."

Column 4, Line 24 reads, "...initial steps through which the all..." which should read, "...initial steps through which all..."

Column 5, Line 8 reads, "...has been sent..." which should read, "...have been sent..."

Column 7, Line 4 reads, "...the process of the invention are describe..." which should read, "...the process of the invention are described..."

Column 7, Line 6, reads, "...this specific order, alternative ordering..." which should read, "...this specific order; alternative ordering..."

Column 7, Line 7 reads, "...ordering of the steps of the invention are possible..." which should read, "ordering of the steps of the invention is possible..."

Column 7, Line 7 reads, "...possible, this order..." which should read, "...possible. This order..."

Column 7, Line 26 reads, "...serious and/or help has arrived." which should read, "serious and/or help has arrived)."

Column 7, Line 52 reads, "...if it is a medial (illness)..." which should read, "...if it is a medical (illness)..."

UNITED STATES PATENT AND TRADEMARK OFFICE
CERTIFICATE OF CORRECTION

PATENT NO. : 7,428,301 B1
APPLICATION NO. : 09/685697
DATED : September 23, 2008
INVENTOR(S) : Jeffrey J. Clawson et al.

It is certified that error appears in the above-identified patent and that said Letters Patent is hereby corrected as shown below:

Column 8, Line 10 reads, "...and have some meet the paramedics." which should read, "...and have someone meet the paramedics."

Column 8, Line 30 reads, "If it keeps bleeding..." which should read, "If the wound keeps bleeding..."

Column 8, Line 45 reads, "...place, f possible..." which should read, "...place, if possible..."

Column 8, Line 47 reads, "...violent patent instruction is given..." which should read, "...violent patient instruction is given..."

Column 8, Line 48 reads, "...patent instruction 624..." which should read, "patient instruction 624..."

Column 9, Line 16 reads, "...instructions are shown 701." which should read, "...instructions are shown in section 701."

Column 9, Line 20 reads, "...instruction is shown in section..." which should read, "...instruction are shown in section..."

Column 9, Line 25 reads, "...instruction is shown in section..." which should read, "...instruction are shown in section..."

Signed and Sealed this

Second Day of June, 2009

JOHN DOLL
*Acting Director of the United States Patent and Trademark Office*